(12) United States Patent
Chu et al.

(10) Patent No.: US 8,273,679 B2
(45) Date of Patent: Sep. 25, 2012

(54) POROUS CATALYST FOR A FUEL CELL AND METHOD FOR PRODUCING THE CATALYST THEREOF

(75) Inventors: Po-Jen Chu, Baoshan Township, Hsinchu County (TW); Jhuh-Wei Yang, Zhudong Township, Hsinchu County (TW); Chieh-Chun Chang, Taoyuan (TW); Huang-Yu Lee, Fengshan (TW)

(73) Assignee: National Central University, Taoyuan County (TW)

( * ) Notice: Subject to any disclaimer, the term of this patent is extended or adjusted under 35 U.S.C. 154(b) by 0 days.

(21) Appl. No.: 12/889,505

(22) Filed: Sep. 24, 2010

(65) Prior Publication Data

US 2012/0077672 A1 Mar. 29, 2012

(51) Int. Cl.
*B01J 21/18* (2006.01)
*B01J 37/34* (2006.01)
*B01J 27/24* (2006.01)
*B01J 23/00* (2006.01)

(52) U.S. Cl. ............ 502/185; 502/5; 502/200; 502/180; 502/182

(58) Field of Classification Search .................. 502/200, 502/180, 182, 185, 5; 977/773, 810
See application file for complete search history.

(56) References Cited

U.S. PATENT DOCUMENTS

| | | | |
|---|---|---|---|
| 6,787,500 B2 * | 9/2004 | Ito et al. | 502/180 |
| 7,887,771 B2 * | 2/2011 | Sun et al. | 423/445 R |
| 2005/0159310 A1 * | 7/2005 | Ohno et al. | 502/439 |
| 2007/0026294 A1 * | 2/2007 | Shimazaki et al. | 429/44 |
| 2007/0179043 A1 * | 8/2007 | Kojima | 502/60 |
| 2011/0124492 A1 * | 5/2011 | Loukine et al. | 502/159 |

* cited by examiner

*Primary Examiner* — Patricia L Hailey

(57) ABSTRACT

A porous catalyst includes at least one noble nano-metal particle, an oxide for forming porous structures, and a carrier material for supporting the oxide and the at least one noble nano-metal particle. The porous catalyst shows a large electrochemical surface area and a highly conductive ability. Further, the noble nano-metal particles are separated on the oxides uniformly, and the oxide of the catalyst forms a porous structure to provide a large electrochemical surface area. The porous catalyst provides excellent proton/electron transfer ability and increases the reaction rate.

3 Claims, 12 Drawing Sheets

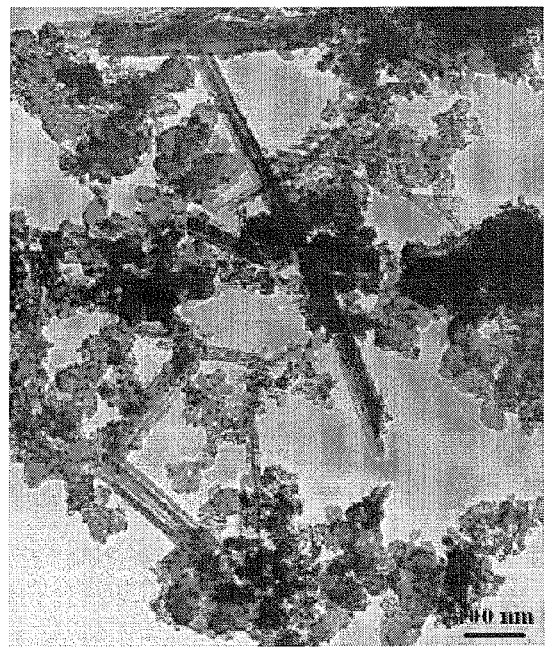
FIG. 2a    FIG. 2b
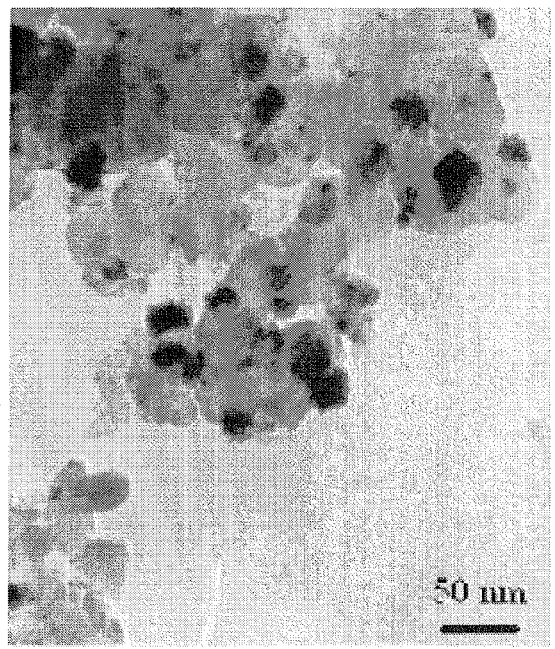
FIG. 2c

POROUS CATALYST FOR A FUEL CELL AND METHOD FOR PRODUCING THE CATALYST THEREOF

FIELD OF THE INVENTION

The present invention relates to a catalyst for a fuel cell and a method for producing the catalysts thereof. In particular, the present invention relates to a porous catalyst for a fuel cell and a method for producing the porous catalyst thereof.

BACKGROUND OF THE INVENTION

A fuel cell is a power generation system for producing electrical energy through an electrochemical redox reaction of an oxidant and hydrogen in a hydrocarbon-based material, such as methanol, ethanol, or natural gas. Such a fuel cell is a clean energy source that may replace fossil fuels. It includes a stack composed of unit cells, and produces various ranges of power. Since it has four to ten times higher energy density than a small lithium battery, it has been highlighted as a small portable power source.

Power generation by fuel cells is based on an oxidation reduction reaction generated on electrodes. Highly active catalysts are essential to improve the performance of the fuel cell. Now, the most popular material for the catalyst contains platinum (Pt), and with the content ratio of Pt increasing, the cost of the catalyst also increases. Therefore, there is a need to increase the efficacy of the catalyst and to produce a stable catalyst for the catalytic reaction.

Carrier materials, also refer to support, of the catalysts affect the metal particle sizes, electrochemistry and catalytic reaction rate of the catalysts. Many researchers focus on the carrier materials of the catalysts. An electro-catalyst is needed to induce the desired electrochemical reactions at the electrodes or, more precisely, at the electrode-electrolyte interfaces. The electro-catalyst may be a metal black, an alloy or a supported metal catalyst, for example, platinum supported on carbon. Most popular carrier materials for the catalyst are carbon materials. The characteristics for an ideal carrier comprise: good electron transfer ability or proton transfer ability, increasing transfer effect of the electrons or protons, large surface for metal particles acting uniformly, showing excellent metal particle absorption ability, stable catalytic ability without being affected by current, chemical stability, porous structure for fuel transfer, cost, etc. As for carbon fibers, a vapor-grown carbon fiber, a carbon nanotube and a PAN type carbon fiber are known. However, in any of the reports which have been made public to date, a technique to produce an electrode comprising a carbon fiber on which fine catalyst particles are uniformly carried with a high density has not been described.

Except carbon materials for the carrier of the catalysts, many metal oxides are also used as the carriers, such as Al, Si, Sn, Ti, Ni, Zr, La and Ce. Electric conductivity of such carriers is worse than carbonfibers, but they show good metal absorption ability so that metal particles separate on the surface of the carriers uniformly. Further, metal particles will not be lost after long term use. Still further, the carriers containing a Ru element could provide active oxygen molecules to oxidize Pt—CO to increase the anti-toxin ability of the electrodes.

As described in Jiun-Ming Chen et al., a gel precursor, made by $TiO_2$, Pt and Ru which were coated on carbon fibers for redox reactions, and the diameters of the above metal particles were reduced 1 to 2 nm when comparing with the catalyst without adding $TiO_2$, and the alloy condition described in Jiun-Ming et al. performed better than conventional ones. Now, it is known that $TiO_2$ increases the well-separation between the catalyst particles.

Huanqiao Song et al. disclosed that $TiO_2$ was applied on the surface of a CNT (carbon-nanotube) for carrying nano metal particles, such as Pt, of the catalyst in ethanol fuel cells. When the ratio of CNT:$TiO_2$ equaled to 1:1, the ethanol fuel cells showed the best performance. When the content of CNT was increased, the electric conductivity reduced and the CO desorption ability also reduced. $TiO_2$-CNT complex carriers show excellent CO stripping ability. Huanqiao Song et al. also used $TiO_2$ nanotube as the carriers. The performance of TiNT carriers showed more excellent CO stripping ability than CNT or $TiO_2$ particles. In CO stripping experiments, catalysts containing TNT/Pt/C show the lowest CO stripping electric potentials. Further, different calcination temperatures show different water content and also affect CO stripping ability. When water content in the carriers increased, the electric potentials for CO stripping would be reduced. However, when the calcination temperature was higher than 400° C., the water content in the carrier could not be self-supplemented.

When metal oxides were used as carriers, they provided bi-functional effects including increasing the anti-toxin ability of carbon monoxide, and metal oxides carriers also increase the absorption ability of PtRu alloy and also produce smaller particles. However, electric conductivity was worse. Therefore, there is a need to increase the electric conductivity of the metal oxides carriers to produce electrons from the surface of metal particles smoothly and prevent catalytic efficacy reduction.

SUMMARY OF THE INVENTION

The present invention relates to a catalyst for a fuel cell which comprises at least one noble nano-metal particle, an oxide for forming porous structures, and a carrier material for supporting the oxide and the at least one noble nano-metal particle.

Preferably, the porous carrier material is made in a shape of a particle, a tube, a star, or a layer.

Preferably, the oxide is $SiO_2$, $Al_2O_3$, $TiO_2$, $ZrO_2$, mesoporous structure metal oxide (MCM) such as MCM-41 and MCM-48, microporous structure metal oxide, such as SBA-1 or a mix of the above oxides. More preferably, the oxide is $TiO_2$ and in a range of 20 to 50 wt %.

Preferably, the porous carrier material is made in a shape of a tube, and the oxide is made of $TiO_2$, $SiO_2$, $Al_2O_3$. More preferably, the oxide and the carrier material are mixed in a range of 1 to 99 wt %.

Preferably, the catalyst further comprises an atomic mole ratio of nitrogen in a range of 1 to 25 wt %. More preferably, the catalyst further comprises the atomic mole ratio of nitrogen in a range of 6 to 10 wt %.

Preferably, the carrier is XC-72, carbon fiber named Ketjen ECP 300, Ketjen BP-2000, single-walled nanotube, multi-walled nanotube, acetylene black, mesocarbon microbead or mesoporous carbon.

Preferably, the at least one noble nano-metal particle is in a range of 5 to 50 wt %. More preferably, the at least one noble nano-metal particle is about 20 wt %.

Preferably, the diameter of the at least one noble nano-metal particle is less than 20 nanometer.

Preferably, the at least one noble nano-metal particle is a single kind of metal particle, an alloy made of two kinds of metal particles or an alloy made of multiple metal particles.

The present invention also refers to a method for producing a catalyst composition for a fuel cell, comprising adding a carbon material and a metal oxide into an organic solvent with reductive ability to form a mixture, mixing the mixture well, adding a precursor of a noble nano-metal particle into the mixture, heating the mixture containing the precursor of the noble nano-metal particle to make the precursor reduce to a noble nano-metal particle, and removing the organic solvent to obtain the catalyst composition.

Preferably, the organic solvent is polyacetals, acids or aldehydes. More preferably, the polyacetal solvent is ethanol, ethylene glycol, glycerine or butanediol.

Preferably, the heating step is provided as a recurrent flow heating method or a microwave heating method.

As the skilled artisan will appreciate, any such method may be modified according to the needs of experiments.

As used herein, the term "a precursor of a noble nano-metal particle" means a metal oxide particle in nano size.

BRIEF DESCRIPTION OF THE DRAWINGS

FIG. 2a is a photo taken by a transmission electron microscope (TEM) of the catalyst (50 nm) obtained from the fourth embodiment in accordance with the present invention.

FIG. 2b is a photo taken by a transmission electron microscope of the catalyst (100 nm) obtained from the fourth embodiment in accordance with the present invention.

FIG. 2c is a photo taken by a transmission electron microscope of the catalyst (50 nm) obtained from the fifth embodiment in accordance with the present invention.

DETAILED DESCRIPTION OF THE INVENTION

Figure 1:
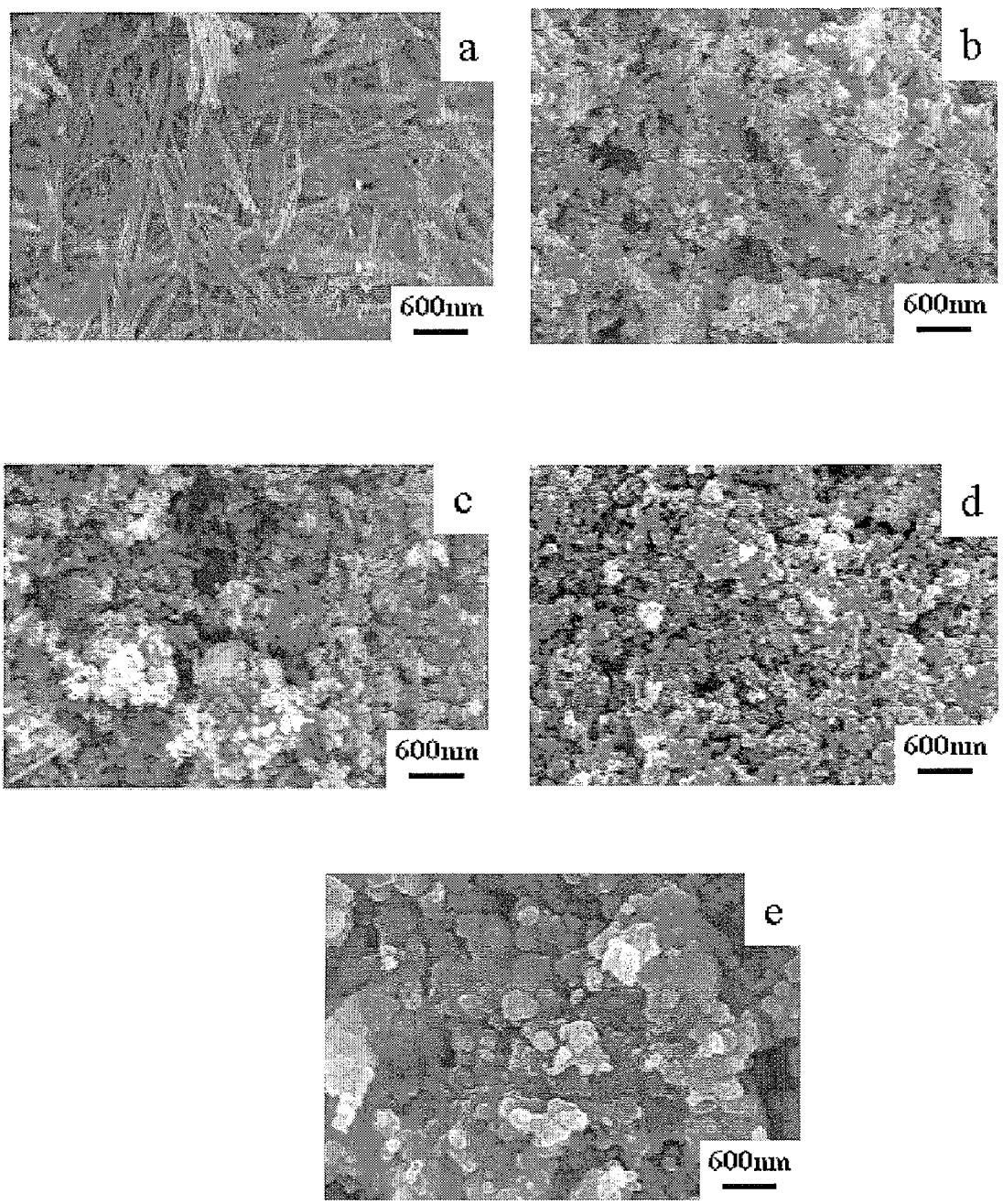
FIG. 1a is a photo taken by a scanning electron microscope showing a catalyst made from the sixth comparative example in accordance with the present invention.
FIG. 1b is a photo taken by a scanning electron microscope showing a catalyst made from the fourth embodiment in accordance with the present invention.
FIG. 1c is a photo taken by a scanning electron microscope showing a catalyst made from the third embodiment in accordance with the present invention.
FIG. 1d is a photo taken by a scanning electron microscope showing a catalyst made from the second embodiment in accordance with the present invention.
FIG. 1e is a photo taken by a scanning electron microscope showing a catalyst made from the first embodiment in accordance with the present invention.

The present invention is described more specifically with reference to the following embodiments. It is to be noted that the following descriptions of preferred embodiments of this invention are presented herein for the purposes of illustration and description only, and it is not intended to be exhaustive or to be limited to the precise form disclosed. In accordance with the present invention, two systems of catalysts containing $TiO_2$ nanotube and modified $TiO_2$ nanotubes added with an N element are tested and disclosed.

The embodiments of the present invention are presented by the following two systems: the metal oxide nanotubes and the improved metal oxide nanotubes doped with nitrogen atoms, wherein the exemplary metal oxide is $TiO_2$.

The method for preparing the support (as used in the present invention, also refers to carriers), i.e. the $TiO_2$ nanotubes (TiNT), is provided as follows, 20 g $TiO_2$ is mixed with 10M NaOH solution, and, then, the mixture is mechanically stirred in an oil bath pan at 110° C. for 72 hours. Subsequently, the mixture is washed with alternate HCl and deionized water to pH=7 by a manner of a filtration. Lastly, the mixture is dried in a dry oven at 80° C.

The method for preparing the catalyst is provided as follows. The compositing ratio of a composed support used for preparing the catalyst is shown in Table 1. 50 mg of the composed support is added into 25 ml ethylene glycol solution, which is served as the solvent and the reductant. After adding adequate 0.05 M chloroplatinic acid solution (H2PtCl6 in ethylene glycol) and 0.05 M ruthenium Chloride solution (RuCl3 in ethylene glycol) into the above solvent and mixing evenly, the reductive reaction is performed with a microwave heating method. After the reduction step, the mixed solution is stirred for cooling and washed repeatedly with deionized water for removing chlorine ions (Cl—), and, finally, a dry step is performed so as to carry out the preparation of the catalyst. The above solvent, ethylene glycol, can be replaced with other organic solvents, such as an alcohol, an acid or an aldehyde, wherein the alcohol can be an ethanol, an ethylene glycol, a glycerol, or a butylene glycol.

TABLE 1

The compositing ratio of a composed support used for preparing the catalysts

| Code | $TiO_2$ wt % | XC-72 wt % | Sample name | Electro-chemical Surface Area (ECSA cm²/g) | On-Set Potential (V) | $I_f/I_b$ CO-tolerance |
|---|---|---|---|---|---|---|
| 1E | 20 | 80 | TX20-PtRu 20-1-mw | 39.31 | 0.149 | 3.30 |
| 2E | 40 | 60 | TX40-PtRu 20-1-mw | 53.16 | 0.134 | 3.32 |
| 3E | 60 | 40 | TX60-PtRu 20-1-mw | 61.76 | 0.117 | 3.71 |
| 4E | 80 | 20 | TX80-PtRu 20-1-mw | 40.24 | 0.191 | 2.04 |
| 5E | 50 | 50 | TX50-PtRu 20-1-mw | 53.18 | — | — |
| 1C | 20 | 80 | $T_{P25}$X20-PtRu 20-1-mw | 42.36 | 0.138 | 2.54 |
| 2C | 40 | 60 | $T_{P25}$X40-PtRu 20-1-mw | 34.74 | 0.156 | 2.77 |

TABLE 1-continued

The compositing ratio of a composed support used for preparing the catalysts

| Code | $TiO_2$ wt % | XC-72 wt % | Sample name | Electro-chemical Surface Area (ECSA $cm^2/g$) | On-Set Potential (V) | $I_f/I_b$ CO-tolerance |
|---|---|---|---|---|---|---|
| 3C | 60 | 40 | $T_{P25}$X60-PtRu 20-1-mw | 35.74 | 0.183 | 2.69 |
| 4C | 80 | 20 | $T_{P25}$X80-PtRu 20-1-mw | 36.96 | 0.214 | 2.18 |
| 5C | 0 | 100 | X-PtRu 20-1-mw | 39.1 | 0.172 | 1.57 |
| 6C | 100 | 0 | T-PtRu 20-1-mw | — | 0.16 | 1.56 |
| 7C | 0 | 100 | E-TEK PtRu Pt20 wt % | 100 | 0.121 | 3.06 |

As used in the column of code, E refers to Embodiment, for example, 1E refers to the first embodiment; C refers to Comparative example, for example, 1C refers to the first comparative example.

EXAMPLES

The weight percents (wt %) of $TiO_2$ and the conductive carbon material (hereafter also refers to XC-72) with high surface area, the electrochemical surface area (ECSA), the on-set potential and the $I_f/I_b$ ratio representing the tolerance for CO-poisoning effect (hereinafter referred to as "CO-tolerance") are shown. The composed supports consisting of $TiO_2$ and XC-72 are 1-99% by weight of the catalyst.

In the first, second, third, fourth, and fifth embodiments shown in Table 1, $TiO_2$ is in a shape of nanotubes and is 20%, 40%, 60%, 80% and 50% by weight of the composed supports. In the first, second, third, and fourth comparative examples shown in Table 1, $TiO_2$ is in a shape of nanoparticles and is 20%, 40%, 60% and 80% by weight of the composed supports. The supports in the fifth, sixth and seventh comparative examples are respectively XC-72, $TiO_2$ and XC-72, and the seventh comparative example is a commercial catalyst E-TEK. In the sixth comparative example, 50% by weight of the conductive carbon material with high surface area (XC-72) is additionally added to serve as a conduction-assisted agent.

As to the sample name in Table 1, taking the sample name "TX20-PtRu 20-1-mw" for example, "TX" denotes the composition of $TiO_2$ and XC-72, "TX20" denotes $TiO_2$ is 20% by weight of the composed supports, "PtRu 20-1" denotes that the atom ratio of Pt and Ru is 20:1, "mw" denotes a microwave heating method is used for preparing the catalyst, and "TP25" denotes that the shape of $TiO_2$ is nanoparticles.

In the first to fourth embodiments, the higher ratio of $TiO_2$ in the composed support creates more pores and consecutive channels in the catalyst. Comparatively, the structure of the catalyst in the first embodiment is more compact. The structure with a large amount of pores and consecutive channels could avoid the aggregation of the catalytic metallic particles and provide channels for transmitting fuels and products. Thus, the catalytic metallic particles could be distributed evenly in the catalyst, and the catalyst would have a high efficiency. In brief, the exposure of the catalytic metallic particles resulted from the porous and loose structure and the consecutive channels in the composed support would increase the catalytic efficiency of the catalyst.

FIG. 1(a)-FIG. 1(e) show the morphology of the first to fifth embodiments catalysts with different titania content from 80 to 20% as supports. The porosity of the catalyst structure increases with increasing the titania content, which will be able to increase the methanol and side-product from the methanol oxidation process transport and to improve the methanol oxidation efficiency.

Comparing FIG. 2(b) with the fourth comparative example in Table 1 where the composed supports both consist of 80 wt % $TiO_2$, the Pt—Ru alloy in FIGS. 2(a)-(b) is evenly distributed on the surface of the $TiO_2$ nanotubes but, in the fourth comparative example of Table 1, is aggregated on the surface of the $TiO_2$ nanoparticles. The size of the particles of the Pt—Ru alloy as determined by the transmission electron microscopy (TEM) is about 3-6 nm. The aggregate of the Pt—Ru alloy as shown in the fourth comparative example of Table 1 would decrease the utility of the catalytic metal. Therefore, compared with the $TiO_2$ nanoparticles and since the $TiO_2$ nanotubes are better braces keeping the loose structure in the catalyst, the composed support consisting of $TiO_2$ nanotubes and XC-72 in the present invention would have the better effect on forming pores and consecutive channels in the catalyst.

In the embodiments of the present invention, in addition to the Pt—Ru alloy nanoparticles, the catalytic metal further includes a single metal, a dual alloy, a multicomponent alloy and the combination thereof. Further, in addition to the XC-72, the support being a carbon-based material comprises at least one of a conductive carbon black, a single-walled nanotube (SWNT), a multi-walled nanotube (MWNT), an acetylene black, a mesocarbon microbead (MCMB) and a mesoporous carbon (CMK) and a combination thereof. As to the porous oxide, $TiO_2$, used in the above embodiments, based on the actual necessity, one skilled in the art could select one from a group consisting of a silicon oxide, an alumina oxide, a titanium oxide, a zirconium oxide, a carbon mesoporous material and a combination thereof. Depending on different manufacturing methods, the porous oxide could have a shape of a particle, a tube, a star, or a layer.

Comparing the electrochemical surface areas (ECSA $cm^2$/g) in the first to fourth embodiments and those of the first to fourth comparative examples in Table 1, it could be found that the increased amount of the $TiO_2$ nanotubes would increase the ECSA, which means that the exposed surface of the catalytic metal is enlarged by the increased $TiO_2$ nanotubes.

Figure 3A:
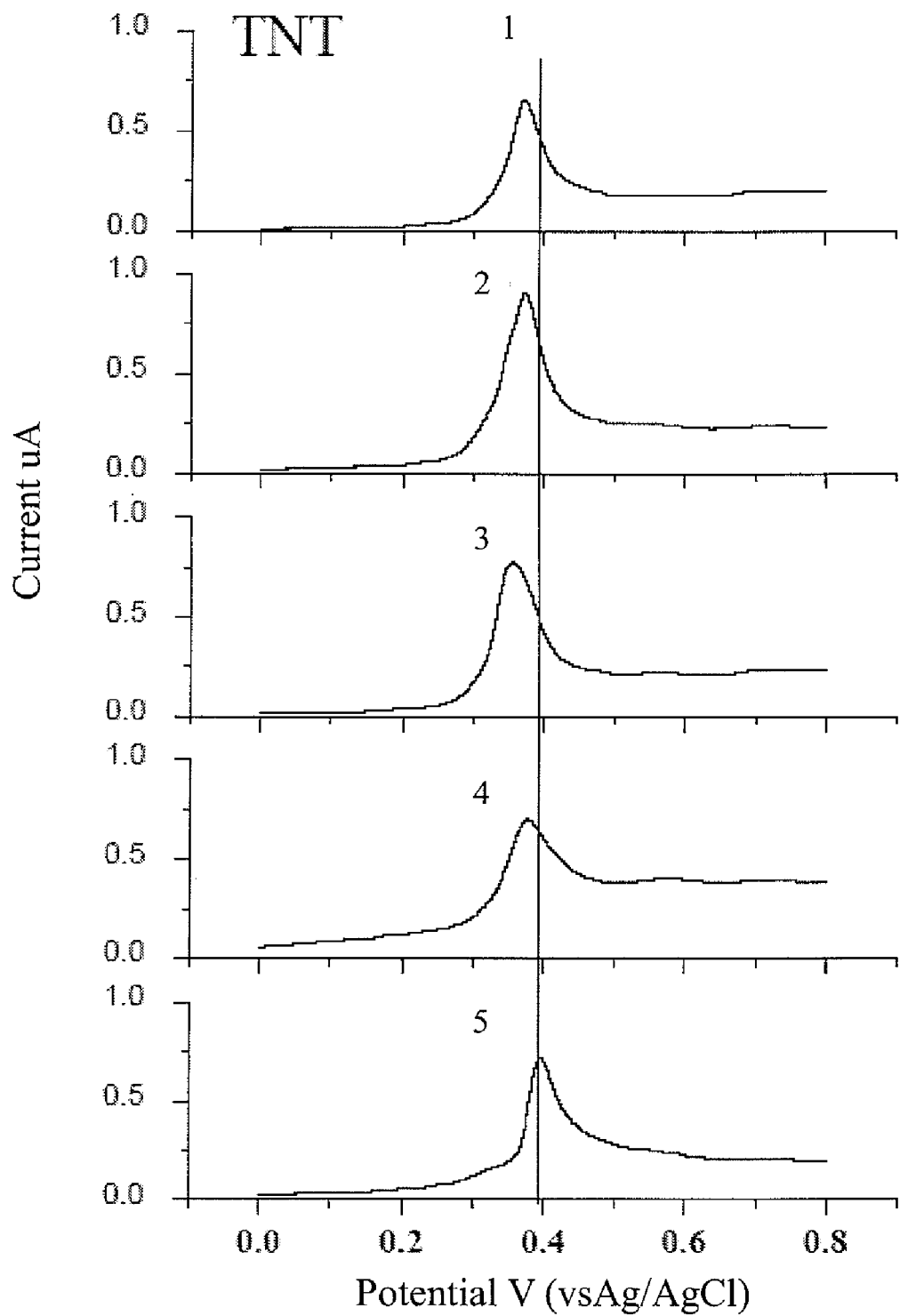
FIGS. 3a to 3c are charts of CO-stripping voltammetry of the first to fourth embodiments in accordance with present invention; with the first to fourth embodiments tested under a constant current for a CO-stripping experiment with a: $Ti_2O_2$ 80%; b: $TiO_2$ 60%; c: $TiO_2$ 40%; $TiO_2$ 20% and the fifth comparative example.
Figure 3B:
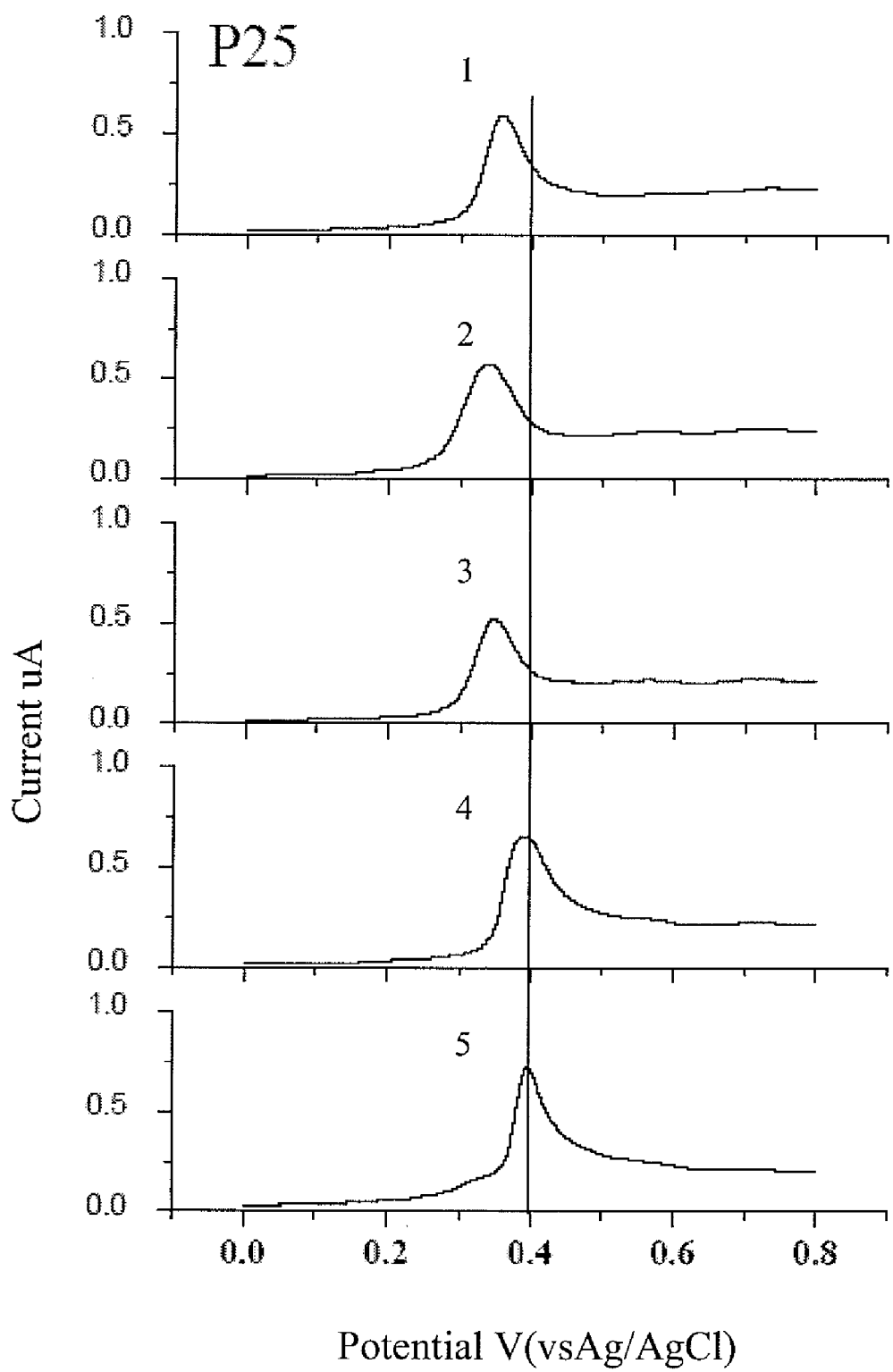
Figure 3C:
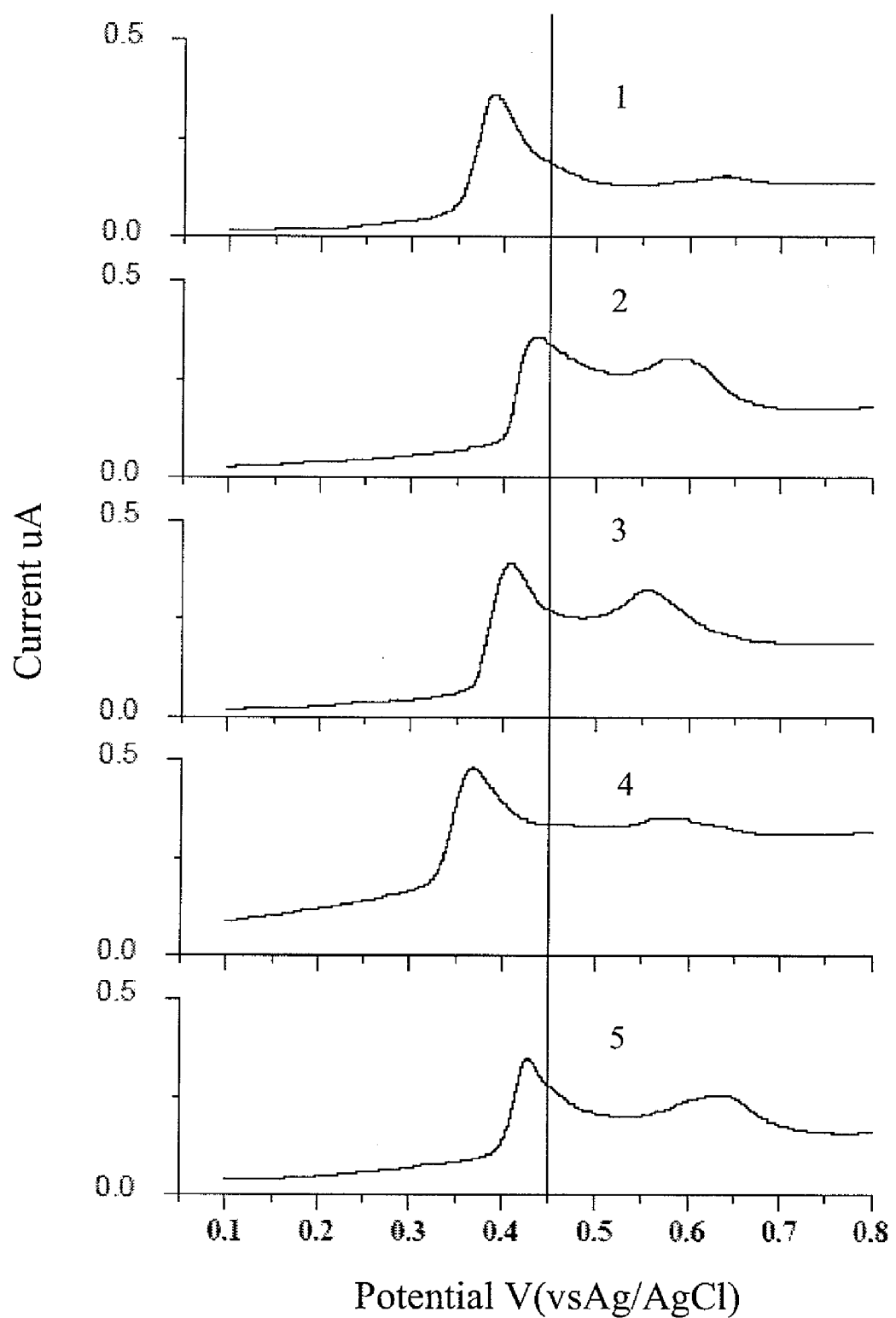

FIGS. 3(a1)-(a4) are CO-stripping voltammetry of the first to fourth embodiments, respectively. FIGS. 3(b1)-(b4) are CO-stripping voltammetry of the first to fourth comparative examples, respectively. FIG. 3(a5), FIG. 3(b5), and FIG. 2(c) are CO-stripping voltammetry of desorption of the carbon monoxide for the fifth comparative example where no $TiO_2$ is included.

The above result means removal of the carbon monoxide is relatively easy to occur in the catalysts with $TiO_2$, and, thus, the catalysts with $TiO_2$ have a better CO-tolerance.

Table 1 shows that the CO-tolerances of the first to third embodiments are all higher than that of the sixth comparative example, and especially higher than that of the seventh comparative example, which is a commercial catalyst E-TEK. Based on the above, it could be known that the catalysts for fuel cells disclosed in the present invention have a good CO-tolerance, which would cause the elongated cycle life of the catalysts.

Please refer to FIGS. 3(c1)-(c5), which are CO-stripping voltammetry of the first to fifth embodiments before and after chronoamperometry test, respectively. The tested catalysts are used to perform a CO-stripping test again by the chronoamperometry (0.7V versus Ag/AgCl). The test result indicates a decreased ECSA of the catalysts, and there is found another signal at the position of 0.55V. Because of the method of chronoamperometry, after a long-time usage of the catalysts, the structure of the alloy in the catalysts is changed. Further, the changes in the crystal planes of the alloy cause a different potential for the CO-desorption. However, after using the catalysts with a high amount of $TiO_2$ nanotubes for a long time, the change in the structure of the alloy is small; that is to say, the catalysts with a high amount of $TiO_2$ nanotubes are relatively stable.

Figure 4:
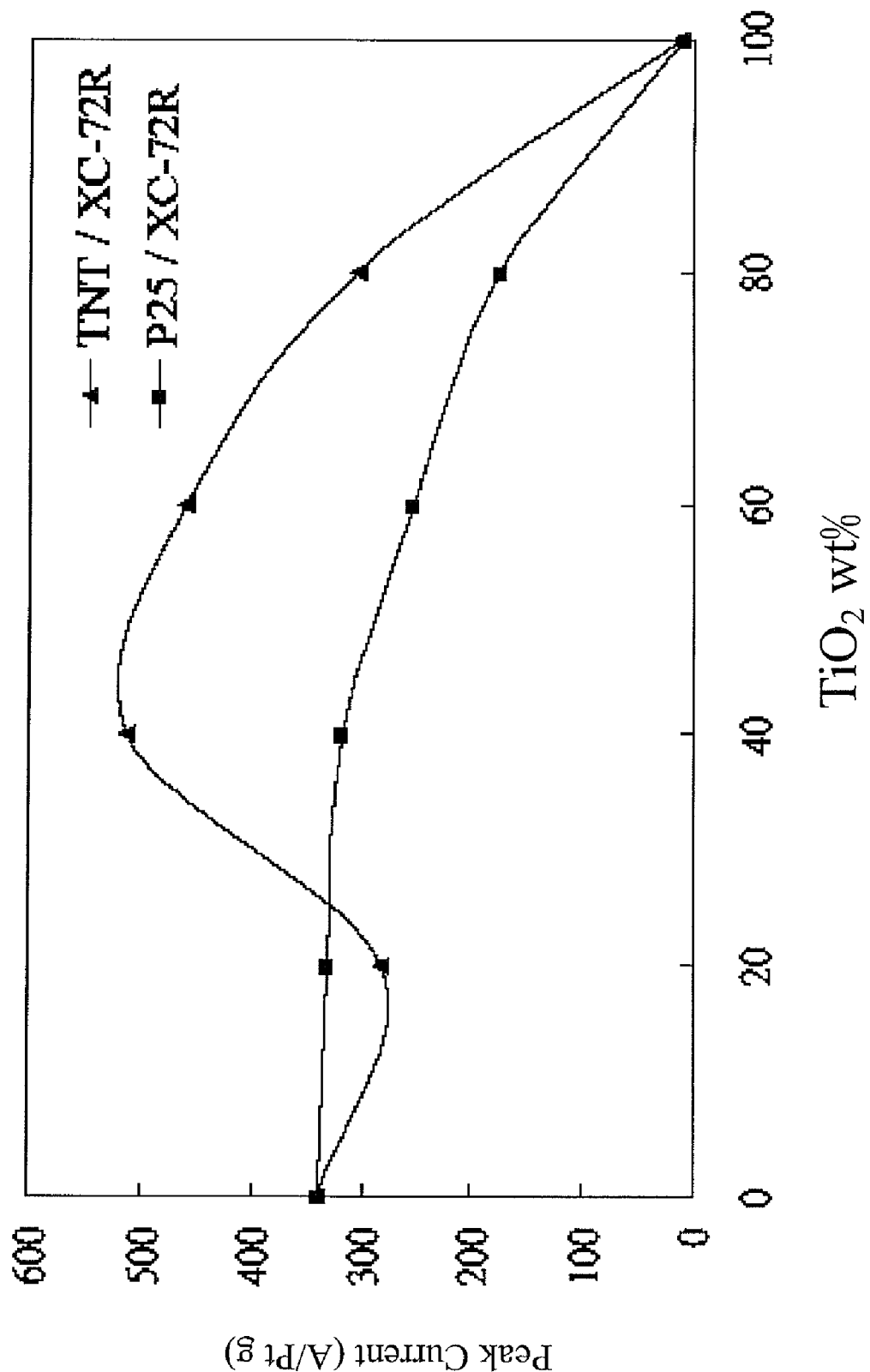
FIG. 4 is a chart of the methanol oxidation electrocatalytic activity as a function of titania content.

FIG. 4 is a diagram showing the effect of the structure of the $TiO_2$ nanotubes (TiNT) on the catalyst of the fuel cell. As shown in FIG. 4, the peak current density of the methanol oxidation rises while the wt % of the $TiO_2$ nanotubes ranges from 20-40%, and an inflection point occurs at 40 wt % of the $TiO_2$ nanotubes. The inflection point represents the optimal combination of the structure of the catalyst, the catalytic efficiency, the active area of the catalyst and the conductivity. The decreased ratio of the carbon material (XC-72) over the inflection point results in the effect of decreasing the efficiency of the catalysts. The abovementioned effect of decreasing the efficiency of the catalysts is larger than the increased efficiency of the catalysts resulted from the structure, TiNT, and the increased active area of the catalysts. Therefore, the net efficiency of the catalysts is decreased. By contrast, the increased amount of the $TiO_2$ nanoparticles in the first to fourth comparative examples represented by the dotted line would lead to a gradually decreased peak current density of methanol oxidation. The gradually decreased peak current density of methanol oxidation is caused by the composed support with a high ratio of the $TiO_2$ nanoparticles and a low ratio of the XC-72, which would decrease the overall conductivity, slow down the catalytic reaction and finally reduce the efficiency of the catalysts and the peak current density. When a catalyst with a support composed of the pure $TiO_2$ without the conduction-assisted agent, XC-72, is used, the methanol oxidative reaction is quite weak.

Under the same ratio of the $TiO_2$ in the composed supports, it could be known from Table 1 that the efficiencies of the second to fourth embodiments are higher than the second to fourth comparative examples. The result indicates that the $TiO_2$ nanotube is effective to increase the activity of the catalysts in comparison with the $TiO_2$ nanoparticle. When the ratio of the TiO2 nanotubes in the composed supports is higher than 40 wt %, there would be a problem of the decreased conductivity as that also exists in the first to fourth comparative examples.

Figure 5:
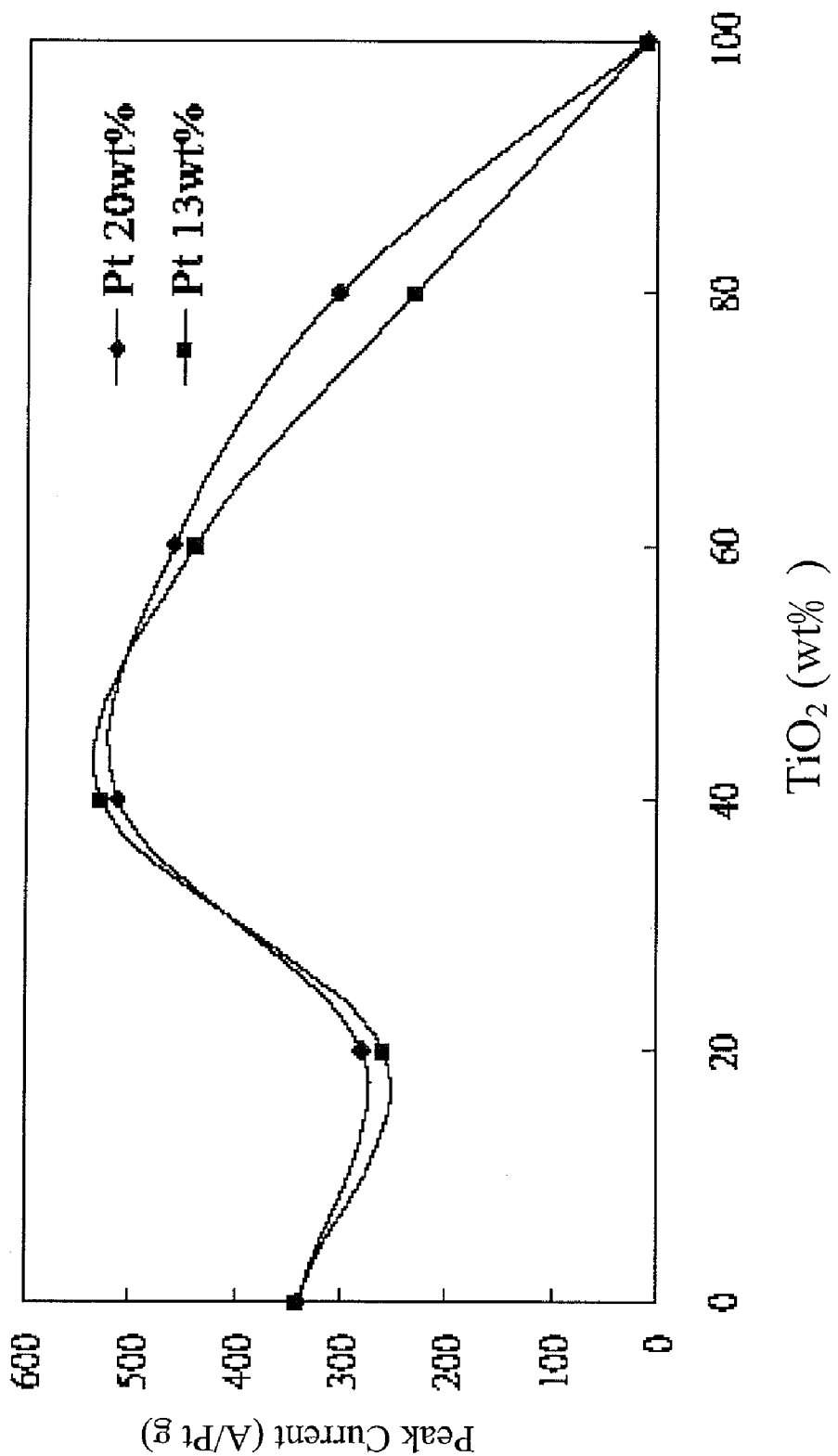
FIG. 5 is a chart of the methanol oxidation electrocatalytic activity as a function of titania content under a different Pt content.

FIG. 5 is a diagram showing the effect of the metal ratio on the catalysts of the fuel cells. The metal (Pt) ratios for this experiment are 20 and 13 wt %. As shown in FIG. 5, the two curves respectively representing 20 and 13 wt % of Pt are simila. The result means that since the surface of the composed support is enough for the distribution of the metallic particles, the efficiency of the catalyst would not be reduced by the increased metal ratio that may result in the possible aggregation of the metallic particles or the large particles formed during the growth of the metal. In the present invention, the metallic particles are about 5-50% by weight of the catalyst, and particularly about 20% by weight of the catalyst.

Figure 6:
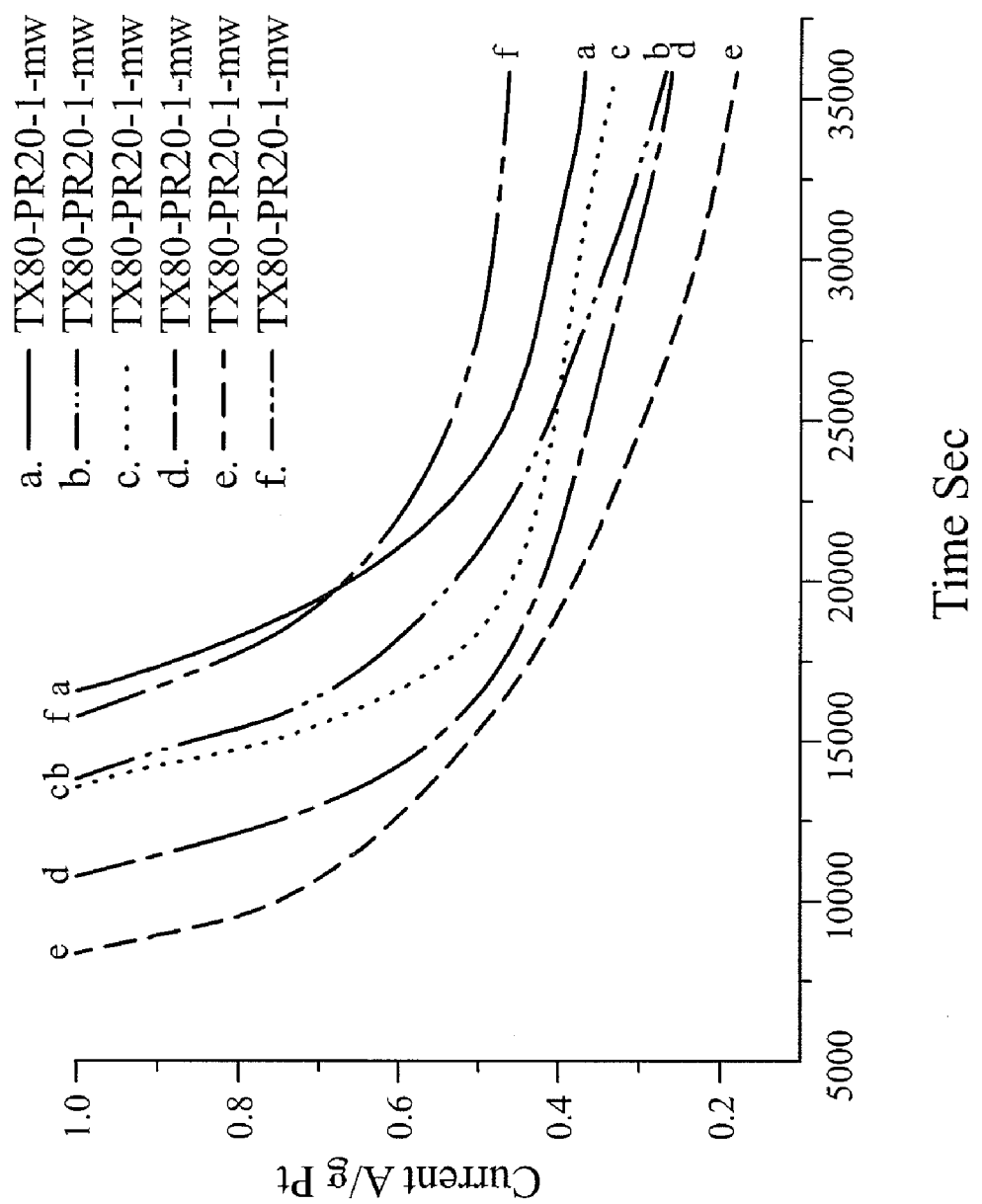
FIG. 6 is a chart of chronoamperometry currents of the first to the fourth, and the sixth to the seventh embodiments.

FIG. 6 is a curve diagram showing the result of the half cell test by using the chronoamperometry. The curves a-e denote the results of the fourth, third, second, and first embodiments and the seventh comparative example, respectively. The stability and longevity of the catalysts are tested by simulating the long-time use of the catalysts in the cells and obtaining the current density-time curve thereof. The test is performed in 0.2 M sulfuric acid and 3% by volume of the methanol solution, at an electrode potential of 0.7 V vs. Ag/AgCl with a rotating electrode at a rotation rate of 600 rpm for 10 hours at room temperature. The result indicates that after a long-time use, the stability and longevity of the catalysts according to the present invention are better than that of the commercial catalyst E-TEK.

The manufacturing method of the $TiO_2$ nanotubes doped with nitrogen atoms is described as follows. The $TiO_2$ nanotubes prepared by the foregoing method are put in an aluminum oxide crucible, and ammonia is introduced into the crucible by heating a tube furnace to 600 ° C. The flow rate is set for 800 and 400 c.c./min with 12 and 18 hours of the reaction time, which could be modulated based on the experimental requirements.

The manufacturing method of the catalyst with the support including $TiO_2$ nanotubes and the nitrogen atoms are performed by the steps of: using 40 mg $TiO_2$ nanotubes doped with nitrogen atoms and 60 mg XC-72 as the support, adding appropriate 50 ml ethylene glycol to be the solvent and the reductant, adding appropriate 0.05 M $H_2PtCl_6$ solution ($H_2PtCl_6$ in the ethylene glycol) and 0.05 M $RuCl_3$ solution ($RuCl_3$ in the ethylene glycol), mixing the above solutions evenly, stirring the mixed solution and using a reflux reduction method at a high temperature for performing the reductive reaction for 3 hours, cooling the mixed solution after the reaction is completed, repeatedly performing a wash step by the deionized water for removing the chlorine ions (Cl—), and finally performing a dry step so as to carry out the preparation of the catalyst.

The denominations of the catalysts doped with nitrogen atoms are described as follows. For example, the embodiment under the condition that the flow rate is 400 c.c./min and the reaction time is 18 hours is denominated as N4-18X40-PtRu-rf, wherein N4-18 represents that the flow rate and the reaction time for the $TiO_2$ nanotubes doped with nitrogen atoms are 400 c.c./min and 18 hours, respectively, X is the XC-72, 40 represents $TiO_2$ nanotubes are 40% by weight of the composed support consisting of the $TiO_2$ nanotubes and the XC-72, PtRu represents the nanoparticles of the alloy formed by using 0.05M $H_2PtCl_6$ solution and 0.05 M $RuCl_3$ solution, and rf represents the method for reducing the metallic precursor is the reflux reduction method.

Table 2 shows the relevant data of the catalyst doped with nitrogen atoms. The relevant data include the weight ratios of the $TiO_2$ nanotubes and the XC-72, the nitrogen content in the catalyst, the mass current density (A/g Pt), and the on-set potential and peak potential of the fuel cell.

In the sixth embodiment shown in Table 2, $TiO_2$ nanotubes are 40% by weight of the composed supports, wherein nitrogen atoms are not doped into the composed supports. In the seventh and eighth embodiments shown in Table 2, $TiO_2$ nanotubes doped with nitrogen atoms are 40% by weight of the composed supports, wherein in addition to the different nitrogen contents, the difference there between further comprises the reaction time. In the eighth comparative example shown in Table 2, $TiO_2$ nanotubes doped with nitrogen atoms are 40% by weight of the composed supports. The catalyst in the ninth comparative example is the commercial catalyst E-TEK. In the sixth comparative example, 60% wt of the conductive carbon material with high surface area (XC-72) is additionally added for serving as a conduction-assisted agent. In the present invention, the nitrogen atoms are doped into $TiO_2$ in an atomic molar ratio of 0-25%, and the $TiO_2$ contains oxygen atoms substituted by the nitrogen atoms in a substitution ratio of 6-10%.

TABLE 2

The effect of different nitrogen contents on the mass current densities of the catalyst

|  | NTiNT wt % | XC-72 wt % | Nitrogen content (at. %) | Sample name | Mass current density (A/g Pt) | On-Set Potential (V) | Peak Potential (V) |
|---|---|---|---|---|---|---|---|
| 6E | 40 | 60 | 0 | TX40-PtRu20-1-rf | 501 | 0.13 | 0.488 |
| 7E | 40 | 60 | 12.15 | N4-18X40-PtRu20-1-rf | 671 | 0.12 | 0.51 |
| 8E | 40 | 60 | 7.52 | N4-12X40-PtRu20-1-rf | 564 | 0.12 | 0.47 |
| 8C | 40 | 60 | 10.17 | NP25X-PtRu20-1-rf | 389 | 0.12 | 0.56 |
| 9C | 0 | 100 | 0 | E-TEK PtRu Pt20 wt % | 358 | 0.13 | 0.51 |

As used in the column of code, E refers to Embodiment, for example, 6E refers to the sixth embodiment; and C refers to Comparative example, for example, 8C refers to the eighth comparative example.

Figure 7B:
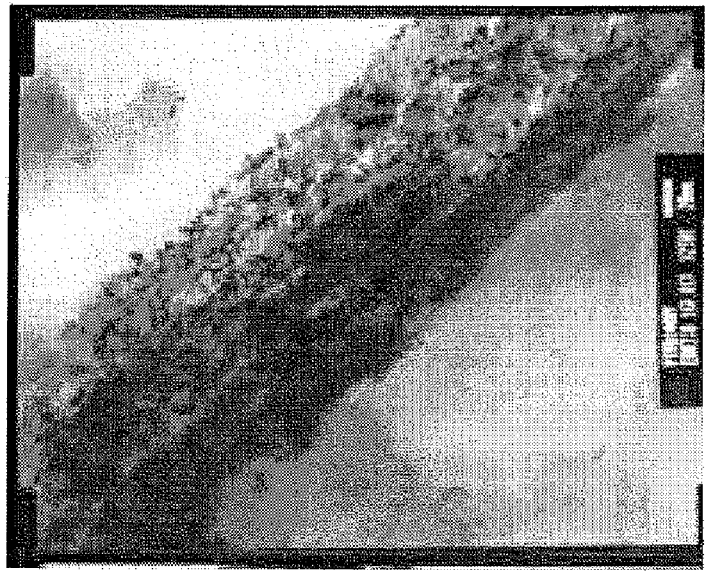
FIG. 7b is a photo showing a microstructure of the catalyst support doped with nitrogen by HRTEM according to the present invention.
Figure 7A:
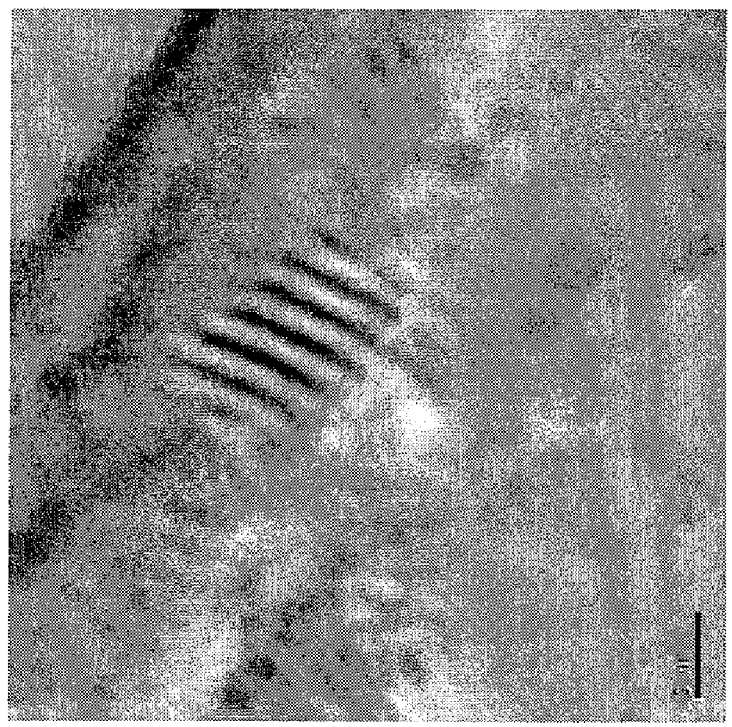
FIG. 7a is a photo showing a microstructure of the catalyst support doped with nitrogen by TEM in accordance with the present invention.

FIG. 7(a) is a diagram showing the $TiO_2$ nanotubes doped with nitrogen atoms according to the seventh embodiment of the present invention. As shown, the orderly ranged creases are generated on the $TiO_2$ nanotube doped with nitrogen atoms. The $TiO_2$ nanotube doped with nitrogen atoms is apparently different from the slick $TiO_2$ nanotube without doping with the nitrogen atoms. During the heterogeneous reaction, the nitrogen atoms, being highly electro-negative, replace the oxygen atoms to bond to the titanium atoms. Thus, since the Ti—O—Ti bond is transformed to the Ti—N—Ti bond, the original structure where a titanium atom bonds to four oxygen atoms is changed.

The above mentioned replacement not only increases the conductivity of the nanotube, but also changes the surface lattice ordering, which results in the new lattice distance and thus generates the phenomenon of the creases. In FIG. 7(a), the size of the PtRu alloy particles are about 4 nm. In the present invention, the metallic particles could have a nanosize less than 20 nm, and the metallic particles could be made of a single metal, a dual alloy, a multicomponent alloy or a combination thereof.

FIG. 7(b) is a diagram showing the transmission electron microscope (TEM) result of the alloy particles being supported by the composed support of the catalyst according to the present invention. The composed support includes the conductive support and the porous structure. The conductive support is made of a conductive material, which is preferably the conductive carbon material (XC-72) with high surface area. The porous structure could be made of the inorganic materials, and is preferably a $TiO_2$ nanotube doped with nitrogen atoms. The rough surface of the $TiO_2$ nanotube doped with nitrogen atoms facilitates the methanol solution to be close to the conductive support and to cause the oxidation thereof, The distribution of the metallic nanoparticles is even, and the size thereof is uniform, which means that the metallic nanoparticles have a good absorption ability to the conductive support. Thereby, the utilization ratio of the catalytic metal, which is usually an expensive metal, would be raised. Because of this advantage, the amount of the metal required to be used is reduced. Further, the cost of the catalysts for the fuel cells could be decreased by increasing the metallic surface that reacts with the fuel.

Based on FIG. 7(b), it could be realized that there are pores and consecutive channels in the porous catalyst containing nitrogen atoms. The porous structure avoiding the self-aggregation of the catalytic metal is helpful to the distribution thereof and provides channels for transmitting fuels and products. Further, the exposure of the catalytic metallic particles caused by the porous and loose structure and the consecutive channels in the catalyst would increase the catalytic efficiency of the catalyst.

Figure 8A:
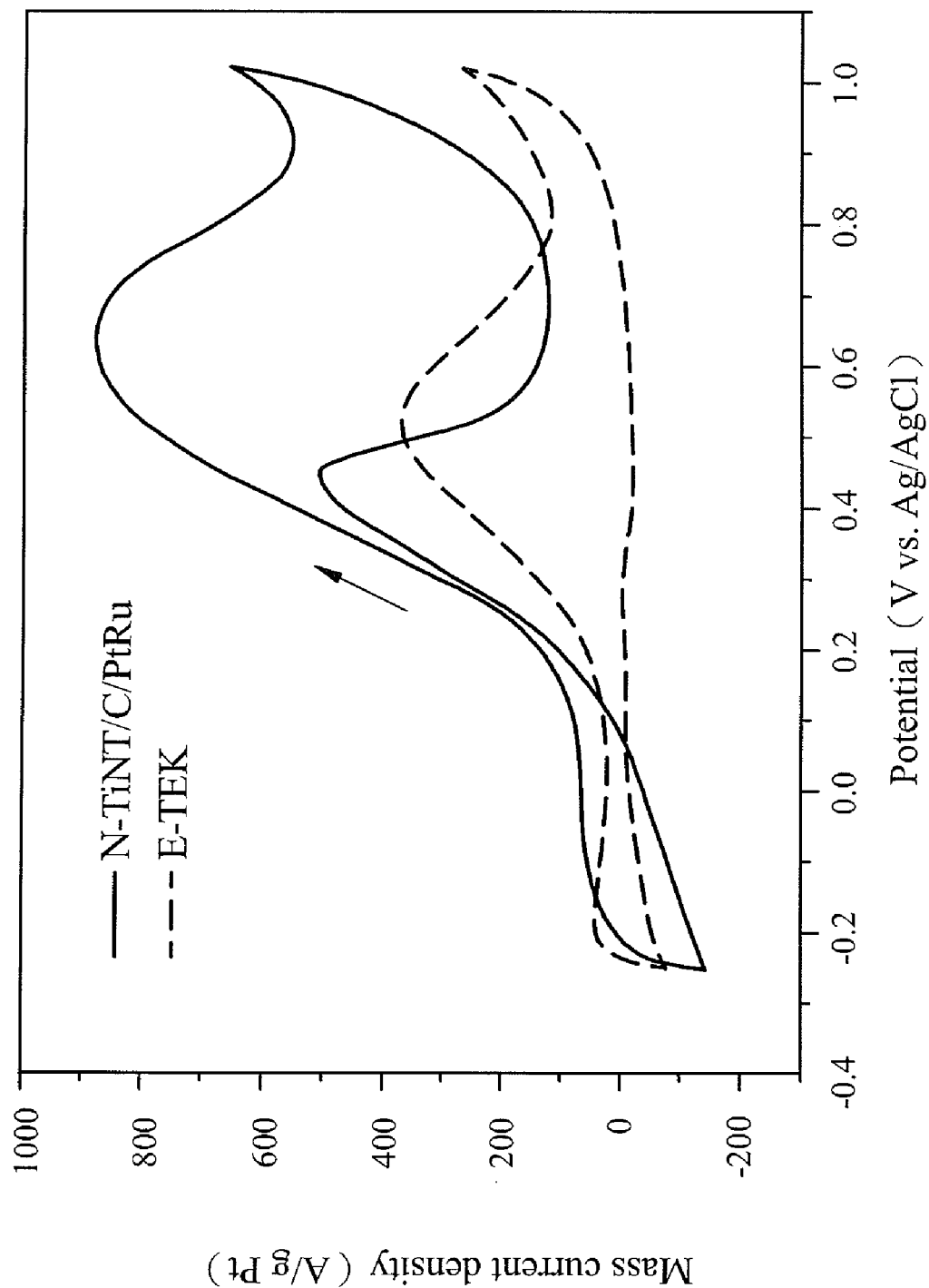
FIG. 8a is a chart showing cyclic voltammetries of the seventh embodiment and ninth comparative example in accordance with the present invention.
Figure 8B:
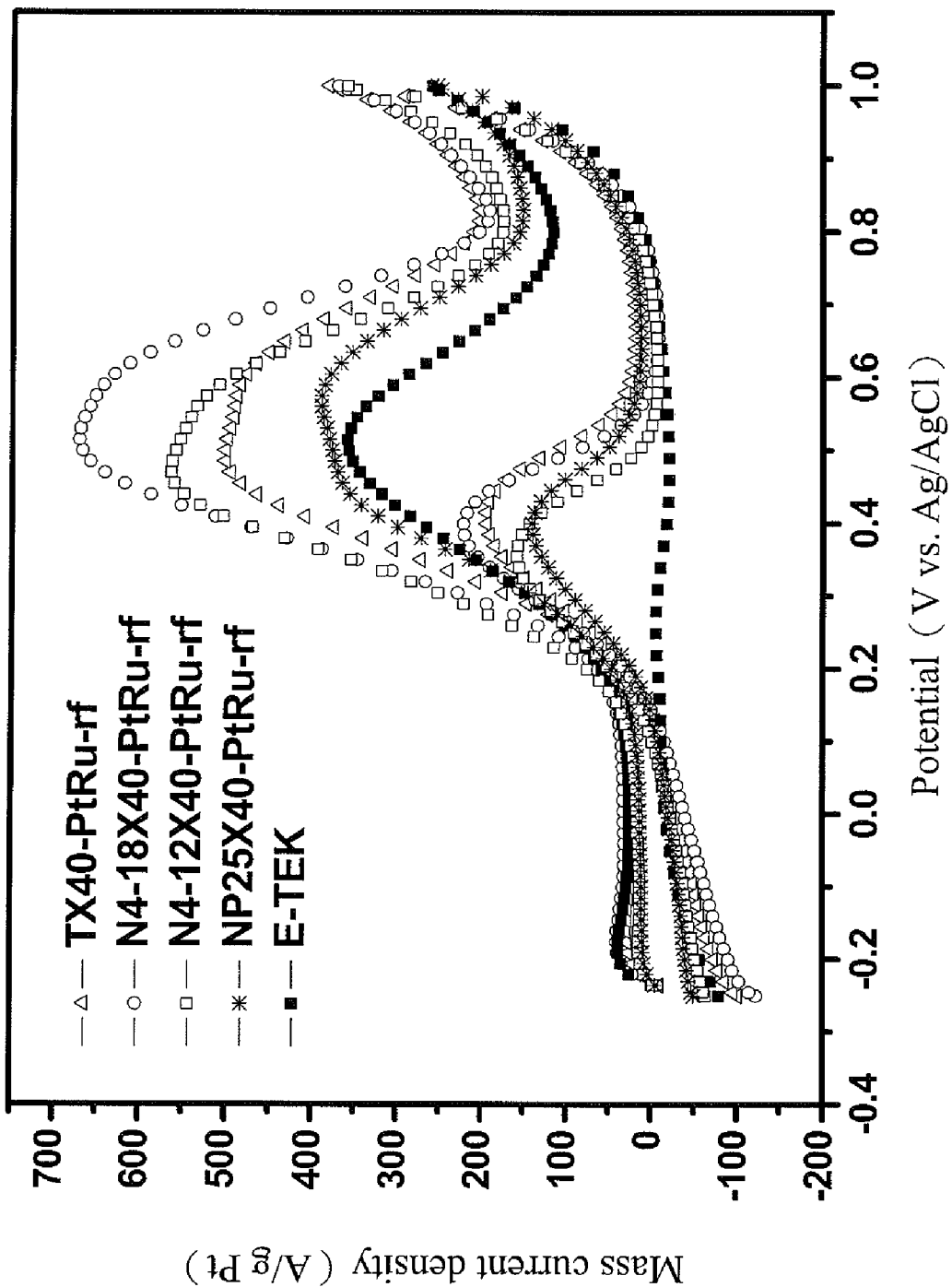
FIG. 8b is a chart showing cyclic voltammetries of the sixth to the eighth embodiments and the eighth to the ninth comparative examples in accordance with the present invention.

FIG. 8(a) is a diagram showing the comparison of the mass current densities between the catalyst according to the present invention and the commercial catalyst based on a cyclic voltammetry (CV). As shown, the maximum mass current density for the composed support consisting of the $TiO_2$ nanotube doped with nitrogen atoms and the XC-72 is 859 (A/g Pt), and that of the commercial catalyst E-TEK in the ninth comparative example is 358 (A/g Pt), which means that the composed support of the present invention has the effect on raising the oxidation capacity of the methanol. The $TiO_2$ nanotube is a support with large surfaces for carrying the metallic particles. Further, on the surface of $TiO_2$, there are many functional groups helpful to absorb the methanol solution, which property is different from the carbon materials. The force between $TiO_2$ and the metallic particles that result in the particle size ranging between 4-5 nm and in the uniformity of the particle size is advantageous in increasing the mass current density. Because of the above reasons, compared with the XC-72, it is better to use the $TiO_2$ nanotube as the support. Moreover, it is much better to use the $TiO_2$ nanotube doped with the nitrogen atoms as the support that increases the conductivity of $TiO_2$ and changes the electronic configuration of the catalytic metal for increasing the efficiency of the catalyst.

to FIG. 8(b) is a diagram showing the effect of different nitrogen contents on the mass current densities of the catalyst according to the present invention and the commercial catalyst. The embodiments and comparative examples in Table 2 are shown in FIG. 8(b). As shown, the mass current densities of the sixth to eighth embodiments are all higher than the eighth comparative example, wherein the differences in the current densities are caused by the difference between the surfaces of the $TiO_2$ nanotube and the $TiO_2$ nanoparticles, which proves that the large surface of the support is advantageous in increasing the catalytic effect of the methanol. Table 2 further shows that the mass current densities of the sixth to eighth embodiments are all higher than the ninth comparative example, which indicates that the existence of $TiO_2$ is advantageous in increasing the catalytic effect of the methanol. Compared with the sixth and the seventh embodiments, the result indicates that the nitrogen atoms doped in the surface of the $TiO_2$ nanotube is advantageous in increasing the catalytic effect of the methanol, and the major reason thereof is that the increased conductivity would facilitate the effective transmission of the electrons in the catalyst.

Table 2 further shows that the difference in the reaction time and the flow rate between the seventh and eighth embodiments would affect the catalytic activity of the methanol as well. Based on the XPS test, the nitrogen contents of the seventh and eighth embodiments are 12.15 at. % and 7.52 at. %, respectively, but the seventh embodiment has a better catalytic ability of the methanol than the eighth embodiment according to Table 2 and FIG. 8(b). The above result is because that the nitrogen content is positive related to the conductivity and the activity of the catalyst, which means that the nitrogen atoms could effectively change the energy level of the $TiO_2$ nanotubes and thus increase the conductivity. It could be known from Table 2 that compared with the single support, the composed supports have a better effect on the on-set potential and the peak potential of the methanol oxidation reaction. The above result is because, since the composed support would establish a better mode of heterogeneous combination of the supports, the electrons could be transmitted from the surface of the PtRu through the composed support consisting of the $TiO_2$ nanotubes doped with nitrogen atoms and the XC-72 to outside, and, thus, PtRu could continue to catalyze next methanol molecule. In addition, the porous structure of the composed support could increase the ability of the transmission.

Figure 9:
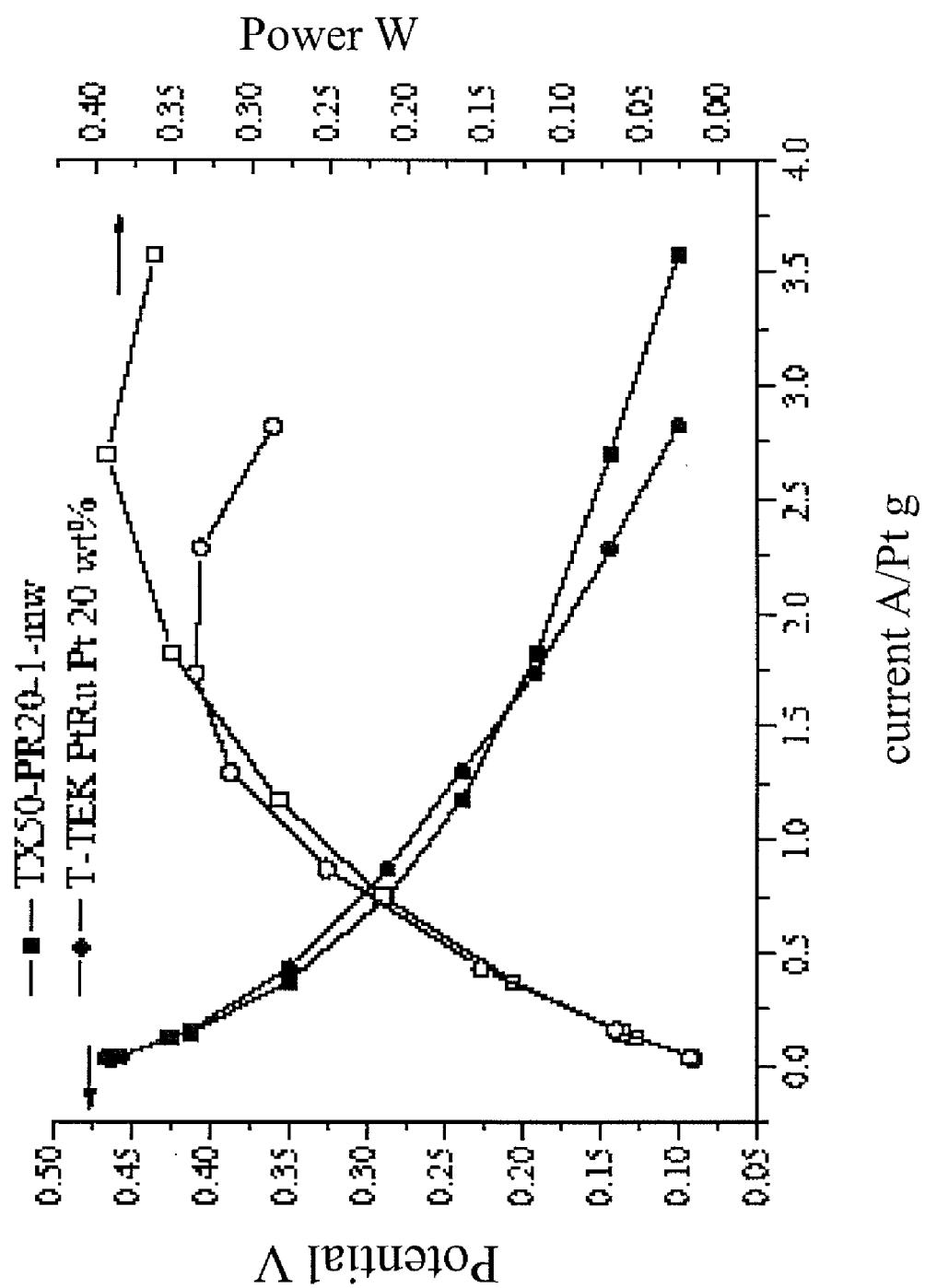
FIG. 9 is a chart showing the polarization curves of the membrane electrode assemblies prepared by the catalysts of the seventh comparative example and the fifth embodiment.

FIG. 9 which is a diagram showing the polarization curves of the membrane electrode assemblies (MEA) prepared by the catalysts of the seventh comparative example and the fifth embodiment. As shown, the open circuit voltages (OCVs) of the two catalysts are similar, corresponding to the results of the catalytic activity of the methanol oxidation reaction. The OCVs of the two catalysts are about 0.45 V. The maximum output powers of the fifth embodiment and the seventh comparative example are 0.4 and 0.35 W/g Pt, respectively.

In conclusion, the metallic oxide, such as $TiO_2$ and particularly that doped with nitrogen atoms, could generate a strong force between the nano-metal, such as Pt, PtRu and so on, and stabilize the size of the nano-metal. In addition, the OH group on the surface of the $TiO_2$ nanotubes is helpful to increase the CO-tolerance and to decrease the on-set potential. The higher ratio of the $TiO_2$ nanotubes would increase the catalytic performance of the catalyst and maintain the stability of the catalyst after long-time use.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

The invention claimed is:

1. A method for producing a catalyst composition for a fuel cell, comprising:
    adding a carbon material and a metal oxide doped with nitrogen into an organic solvent with reductive ability to form a mixture;
    mixing the mixture;
    adding a precursor of a noble nano-metal particle into the mixture;
    heating the mixture containin the recursor of the noble nano-metal article to make precursor reduce to a noble nano-metal particle, wherein heating the mixture is provided as a recurrent flow heating method or a microwave heating method; and
    removing the organic solvent to obtain the catalyst composition.

2. The method according to claim 1, wherein the organic solvent is polyacetals, acids or aldehydes.

3. The method according to claim 2, wherein the polyacetal solvent is ethanol, ethylene glycol, glycerine or butanediol.

* * * * *